June 16, 1942.   A. B. YEARTA   2,286,247
DISPLAY DEVICE
Filed May 12, 1941   2 Sheets-Sheet 1

Alton B. Yearta.
INVENTOR.

BY
Victor J. Evans & Co.
ATTORNEYS

June 16, 1942.  A. B. YEARTA  2,286,247
DISPLAY DEVICE
Filed May 12, 1941  2 Sheets-Sheet 2
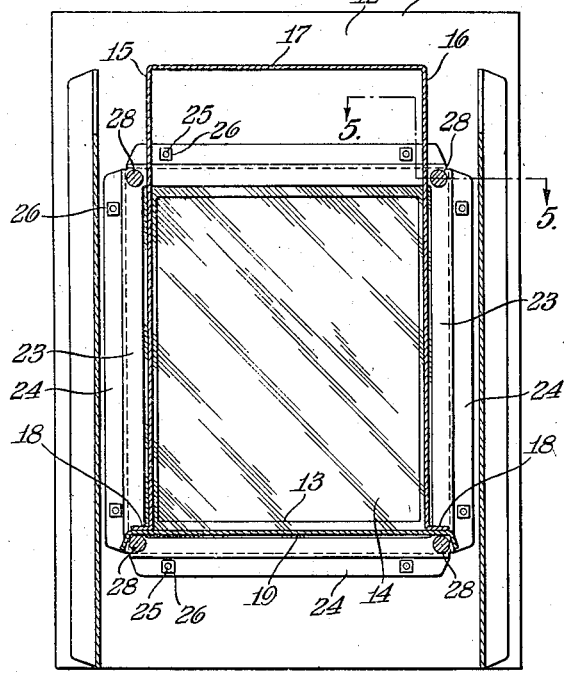
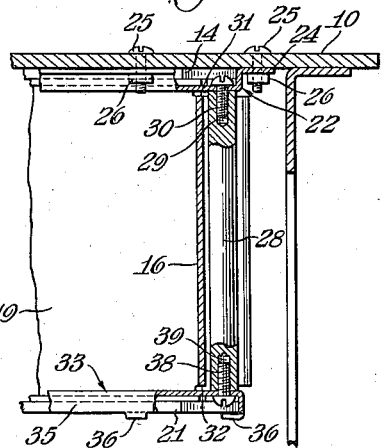
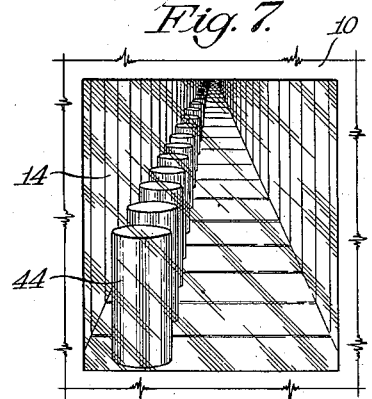
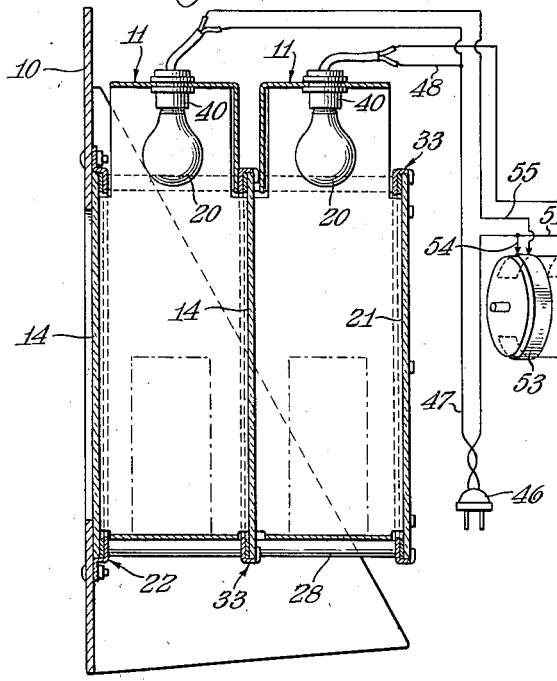
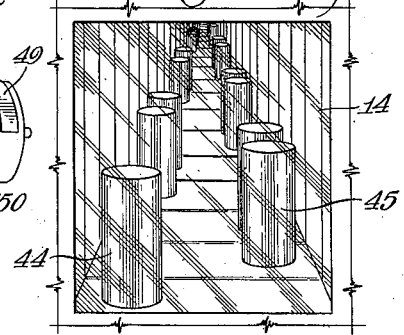
Alton B. Yearta.
INVENTOR.
BY
Victor J. Evans & Co.
ATTORNEYS Patented June 16, 1942

2,286,247

UNITED STATES PATENT OFFICE 2,286,247

DISPLAY DEVICE

Alton B. Yearta, Winter Haven, Fla., assignor of one-third to Ross H. Mooty, Sr., and one-third to H. E. Cornell Application May 12, 1941, Serial No. 393,141

10 Claims. (Cl. 272—13)

My invention relates to new and useful improvements in display devices.

An important object of my invention is the provision of an illuminated display device for holding an article to be displayed, which device includes mirrors arranged in such a manner that a multiplicity of reflections of the article are obtained whereby an observer instead of seeing only one article will see an infinite number of the same.

Still another object of my invention is the provision of a device of the above-mentioned character that includes a housing which may be readily disassembled to permit parts of various sizes to be used whereby the device may be made to accommodate articles of various sizes and whereby the mirrors will at all times be properly spaced from the article to assure a proper display of the same.

Still another object of my invention is the provision of a device of the above-mentioned character wherein the housing is uniquely constructed to permit a plurality of the housings to be associated with each other in such a manner that objects placed in each of the housings may be made to appear in progressive sequence.

Other objects and advantages of my invention will be apparent during the course of the following description.

In the drawings forming a part of this specification and in which like numerals are employed to designate like parts throughout the same:

Figure 4 is a transverse sectional view taken on the line 4—4 of Figure 2,

Figure 1:
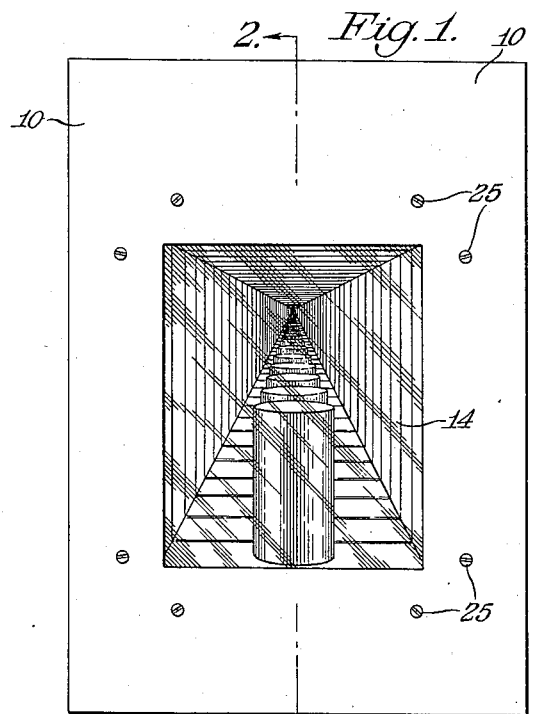
Figure 1 is a front elevation of a device embodied in my invention.

Figure 5 is a fragmentary horizontal transverse sectional view taken on the line 5—5 of Figure 4, Figure 6 is a vertical sectional view illustrating two of the housings operatively associated with each other, Figure 7 is a front elevation of the form of the invention as illustrated in Figure 6 and showing the manner in which an article placed in the foremost housing is reflected when only the lamp means mounted in that housing is illuminated, and Figure 8 is a front elevation of the form of the invention as illustrated in Figure 6 showing the manner in which articles placed in both the front and rear housings are reflected when the lamps in both of the housings are illuminated.

In the accompanying drawings, wherein for the purpose of illustration, is shown a preferred embodiment of my invention, the numeral 10 designates a vertically disposed supporting panel on which the housing 11 receiving the article to be reflected is mounted. The panel may be formed of any suitable material such as wood, sheet metal, plastic, etc.; however, I have found that the same may be satisfactorily formed from a relatively heavy grade of cardboard, this material being preferred in the interest of economy of construction. The article to be displayed is placed within the housing 11 and a person standing in front of the panel may observe the article through an opening 13 formed centrally therein which opening is closed by a transparent mirror 14 interposed between the panel and the housing.

The housing is preferably formed of cardboard, or the like, and comprises spaced vertical side walls 15 and 16 integrally connected by a top wall 17. The lower ends of the side walls are bent outwardly to form flanges 18 and the flanges are adhesively or otherwise fixedly secured to a bottom plate 19. The housing is preferably of substantially greater height than the opening 13 in the panel and it is mounted with the top wall 17 thereof disposed substantially above the top of the opening whereby to position the lamp 20 carried by the top wall well above the line of vision of the person standing in front of the panel.

The open front of the housing is obviously closed by the transparent mirror 14 and the open rear thereof is closed by a mirror 21 which may be either opaque or transparent. If the device is to be used only as a display to be observed from a position in front of the panel 10, the mirror 21 may be an opaque mirror. When this construction is used and the lamp 20 is illuminated the person in front of the panel may look through the transparent mirror 14 and observe the article placed within the housing. If the article is placed equi-distant from each of the mirrors, a person standing in front of the panel will observe an infinite number of equi-spaced reflections of the article in the opaque mirror 21 disposed rearwardly thereof. If, however, the device is to be used as a display to be observed from position in front of either of the mirrors 14 or 21, it will be necessary that the mirror 21 be a transparent mirror. When this last construction is used, a person standing in front of either of the mirrors 14 or 21 will observe in the mirror disposed rearwardly of the article an infinite number of reflections of the same. Thus, when two transparent mirrors are used and the interior of the housing is brightly illuminated the mirror nearest the observer will appear as a plain sheet of glass and the mirror remote from the observer will appear as an ordinary opaque mirror. The transparent mirror nearest the observer will, however, reflect the image of the article back and forth whereby to create the illusion of an infinite number of the articles arranged in a row or column of infinite length, as clearly illustrated in Figure 1.

It will be readily appreciated that a housing of a given size will accommodate only a limited number of articles. If the most efficient results are to be realized the article must be positioned directly between the two mirrors 14 and 21 and the opposite sides thereof must be spaced a requisite distance therefrom. If an attempt is made to place an article within a housing which is too small to accommodate the same, the opposite sides of the article will be positioned too close to the mirrors and the third dimensional effect will be materially affected if not entirely destroyed. I have, therefore, provided a housing which may be easily disassembled to permit various sizes of housings to be interposed between the mirrors 14 and 21. The person setting up the display may then easily select a housing of a size adapted to properly accommodate the particular article desired to be displayed.

Figure 2:
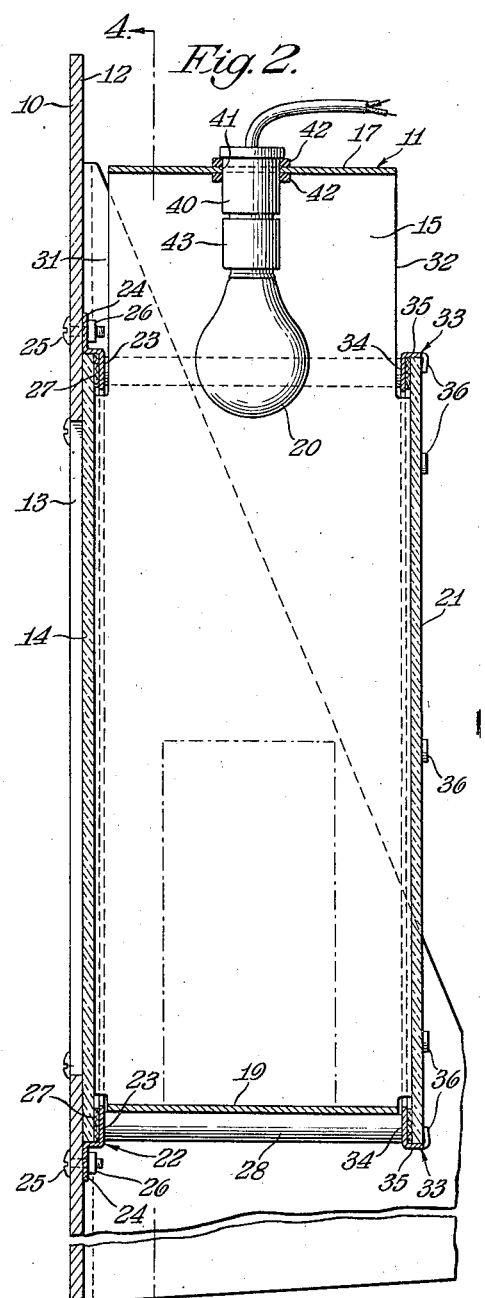
Figure 2 is a longitudinal sectional view taken on the line 2—2 of Figure 1.
Figure 3:
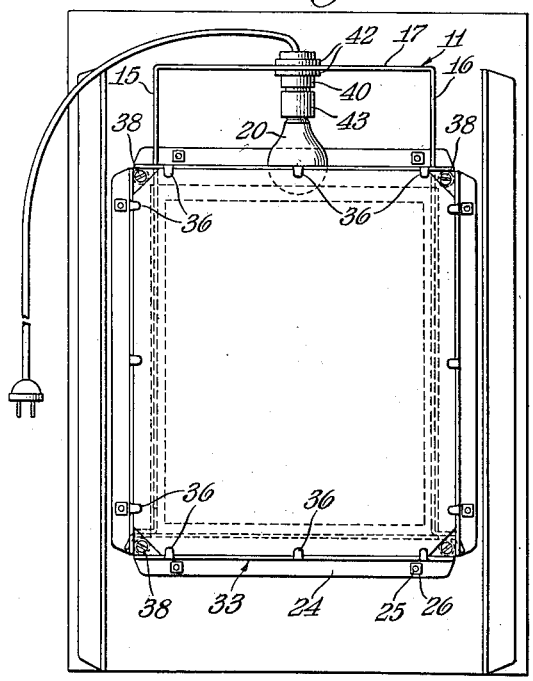
Figure 3 is a rear elevation of my device.

The front mirror 14 is permanently secured to the panel 10 by means of a retaining band 22, the inner and outer marginal edges of which band are laterally offset, as best illustrated in Figure 2. The band encloses the mirror 14 and the inner marginal edge thereof is arranged in overlapping relation with the margin of the mirror. The outer marginal edge of the retaining band engages the rear face 12 of the panel and a plurality of bolts 25 extend through registering openings in the panel and band to receive the nuts 26 which are threaded thereon and into pressed engagement with the band. In order to prevent the band from chipping or marring the edge of the mirror, I have interposed a strip 27 of felt, or the like, therebetween.

Attention is now directed to Figure 5 which best illustrates the manner in which the housing is held in proper association with the mirror and panel. A rod 28 is arranged at each of the four corners of the retaining band 22, the upper rods being located immediately above the panel opening 13 and at opposite sides of the side walls 15 and 16 of the housing and the lower rods being located immediately below the opening 13, at opposite sides of the side walls of the housing and below the bottom plate 19 thereof. The forward ends of the rods are formed with internally screw threaded recesses 29 which threadedly receive the studs 30 welded or otherwise fixedly secured to the retaining band 22. The front of the housing is recessed, as at 31, at its upper and lower ends to accommodate the overlapping inner marginal edge of the retaining band and to permit the portion of the side walls thereof extending between the upper and lower portions of the retaining band to abuttingly engage the rearward side of the transparent mirror 14.

The marginal edge of the rear mirror 21 abuttingly engages the rearward edge of the housing and the upper and lower ends of the housing are similarly recessed, as at 32, to accommodate the second retaining band 33. The band 33 includes a flange portion 34 which extends entirely around the inner marginal edge of the mirror 31 and an overhanging lip portion 35 which extends across the peripheral edge of the mirror. The overhanging lip portion 35 of the band 33 is formed at spaced intervals therearound with tabs 36 which may be bent downwardly and around the mirror 21 to hold the same securely associated with the retaining band. For the purpose of protecting the mirror from marring or chipping, I have provided a strip 37 of felt, or the like, between the flange 34 of the band and the inner surface of the mirror. The retaining band 33 is detachably secured to the rearward ends of the rods 28 by means of the screws 38, the threaded shank portions of which extend through the band and into internally screw threaded recesses 39 in the confronting ends of the rods. In order that the heads of the screws may be properly accommodated, I have chamfered the corners of the rear mirror 21. The opposite ends of the bottom plate 19 extend substantially beyond the lower rods 28 and the extending portions thereof are bent downwardly and around the rods, as best illustrated in Figure 4, to snugly seat the housing thereon and to prevent the same from shifting laterally on the supporting rods.

The lighting unit for the housing includes a socket 40 which extends into the housing through an opening 41 in the top wall of the housing, the socket being securely held in place by means of disks 41 of rubber, or the like, snugly fitted thereto at opposite sides of the top wall. A flasher unit 43 of conventional design and construction is screw threadedly attached to the socket 40 and a conventional light bulb 20 is carried by the flasher unit. The flasher unit operates to alternately illuminate and extinguish the bulb 20 whereby the article within the housing will be made to alternately appear and disappear.

The advantages to be derived from the above described construction are believed to be obvious. A plurality of the housings 11 of graduated depths may be provided to accommodate varying sizes or articles. When it is desired to display an article of a size unsuited for the particular housing attached to the panel, it is only necessary to remove the screws 38 and unthread the rods 28 from the studs 30. As soon as the screws 38 are removed the rear mirror 21 and its retaining band 33 may be removed as a unit. After the rods 28 have been removed they may be replaced by rods of a suitable length to accommodate the housing desired to be applied to the panel. As best illustrated in Figures 2 and 5, the rods are preferably of a length slightly less than the width of the side walls of the housing. When this relationship between the rods and the housing is observed, application of the rear mirror to the housing will cause all of the parts to be held in mutually pressed relation. The front and rear edges of the side walls of the housing will abuttingly engage the front and rear mirrors and the opposite ends of the rods 28 will abut against the first and second mentioned retaining bands 22 and 33.

Suitable written indicia descriptive of the article being displayed may be inscribed on the panels 10 about the opening 13. The alternate illumination of the lamp 20 will attract the attention of passersby and the entire combination of elements will effectively display and advertise the article.

Attention is now directed to Figures 6, 7 and 8 wherein I have illustrated another manner of mounting the housings. In this form of the invention I mount a plurality of the housings 11 in superposed relation rearwardly of the panel 10. The rods 28 are of a length sufficient to accommodate the number of units used, here illustrated as being two in number. The foremost housing 11 is attached to the panel 10 in the manner hereinabove described. The mirror 21 mounted to close the open rear of the foremost housing must, of necessity, be a transparent mirror and the retaining band 33 holding the same is provided with openings through which the rods 28 pass. The next unit 11 is supported on the ends of the rods 28 extending beyond the foremost housing and is disposed in abutting engagement with the rear face of the intermediate transparent mirror 21. Another mirror 21 and retaining band 33, the mirror being either opaque or transparent, is detachably secured to the ends of the rods in the manner hereabove described.

The chief advantage of mounting the housings in multiple units is to achieve a startling and unique effect which may not possibly be obtained by using but one of the housings. The effect obtained is clearly illustrated in Figures 7 and 8. If an article 44 is placed in the foremost housing 11 and another article 45 is placed in the rearmost housing 11 they may be made to appear singly or collectively by illuminating either the foremost lamp or by simultaneously illuminating both of the lamps. If only the foremost lamp is illuminated, the observer will see only the article 44 in the manner illustrated in Figure 7. If, however, both of the lamps 20 are illuminated the observer will see both of the articles 44 and 45 in the manner illustrated in Figure 8. Any number of the housings 11 may be mounted in the manner illustrated by providing rods 28 of sufficient length and, by progressively illuminating all of the lamps in the housings, a plurality of articles, either similar or dissimilar, may be made to appear. It must be remembered, however, that the mirrors 21 separating the housings must be transparent mirrors while the rearmost mirror 21 may be either a transparent or opaque mirror.

When I mount the housings in multiple units, I eliminate the flasher unit 43 and mount the bulbs 20 directly in the sockets 40. The male plug 46 is connected to a source of current supply and the conductors 47 and 48 connect one terminal thereof with one terminal of each of the lamps 20 in the housings. The other terminal of the male plug is connected by the conductors 51 and 54 to the separate contacts 49 and 53 carried by the insulated commutator drum 50. The drum is continuously rotated and each of the conductors 51 and 54 is provided with a contact arm which wipingly engages the contacts. The conductors 52 and 55 are similarly provided with contact arms which wipingly engage the respective contacts 49 and 53 and the conductors extend from the contact arms to the other terminal of the bulbs 20. This construction is illustrated diagrammatically in Figure 6 and, as will be observed, the contact 53 which controls the illumination of the foremost bulb 20 is of substantially greater length than the contact 49 which controls the illumination of the rearmost bulb 20. When the drum is rotated the contact arms of the conductors 54 and 55 will first engage the contacts 53 to effect illumination of the bulb 20 in the foremost housing. As soon as the contact arms engage the contact 53 the person standing in front of the panel 10 may see through the transparent mirror 14 and observe multiple reflections of the article 44 positioned within the housing. Continued rotation of the drum 50 will cause the contact arms carried by the conductors 51 and 52 to engage the contact 49 whereby to effect illumination of the bulb 20 in the rearmost housing. At this time the bulbs in both of the housings will be illuminated and the observer may see both of the articles 44 and 45 in the manner illustrated in Figure 8. Further rotation of the drum 50 will effect simultaneous disengagement of all of the contact arms from the contacts 53 and 49 whereupon all of the bulbs 20 will be extinguished.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. A display device comprising a support having an opening, a transparent mirror for closing the opening in the said support, a housing having aligning front and rear openings arranged rearwardly of the transparent mirror and with the said front opening disposed in register with the opening in the support, a mirror for closing the rear opening of the housing, and connective means for holding the support, housing and mirrors in the described relation with each other, said means being easily disassembled to permit various sized housings to be used whereby to regulate the distance between the said first and second mentioned mirrors.

2. A display device comprising a support having an opening, a housing having aligning front and rear openings mounted with its front opening in register with the opening in the support, mirrors for closing the front and rear openings of the housing, at least one of the said mirrors being a transparent mirror, lamp means mounted within the housing and at one side of the opening in the said support, and connective means for holding the support, housing and mirrors in the described relation with each other, the said connective means being easily disassembled to permit various sized housings to be used whereby to regulate the distance between the said first and second mentioned mirrors.

3. A display device comprising a support having an opening, a transparent mirror for closing the opening in the said support, retaining means carried by the support and engaging the mirror for holding the same against displacement, a housing having aligning front and rear openings arranged rearwardly of the transparent mirror and with the said front opening disposed in register with the opening in the support, a mirror for closing the rear opening of the housing, and connective means attached to the last mentioned mirror and supporting the housing detachably secured to the said retaining means for holding the respective parts in the described relation with each other.

4. A display device comprising a support having an opening, a transparent mirror for closing the opening in the support, a housing having aligning front and rear openings arranged rearwardly of the transparent mirror and with the said front opening disposed in register with the opening in the support, a mirror for closing the rear opening of the housing, means holding the said first mirror attached to the support, and means holding the housing and the said second mirror detachably connected to each other and to the said first mentioned holding means.

5. A display device comprising a support having an opening, a transparent mirror for closing the opening in the said support, a retaining band carried by the support and having parts extending in overlapping relation with the margin of the mirror for holding the same against displacement, supporting members detachably connected to the retaining band, a housing having aligning front and rear openings disposed rearwardly of the transparent mirror and with its front opening arranged in register with the opening in the support, said housing resting upon the supporting members, a second mirror closing the rear opening of the housing, and a second retaining band having parts attached to the margin of the second mirror and parts detachably connected to the said supporting members.

6. A display device comprising a supporting panel having an opening, a plurality of housings mounted on and extending rearwardly of the supporting panel, the said housings having aligning front and rear openings registering with the opening in the said panel, transparent mirrors interposed between the foremost housing and the panel and between each of the housings, said mirrors closing the front and rear openings of the housings and providing separate compartments for articles to be displayed, a mirror closing the rear opening of the rearmost housing, lamp means in each of the housings, and means for flashing the lamps in a predetermined sequence.

7. A display device comprising a supporting panel having an opening, a plurality of housings mounted on and extending rearwardly of the supporting panel, the said housings having aligning front and rear openings registering with the opening in the said panel, transparent mirrors interposed between the foremost housing and the panel and between each of the housings, said mirrors closing the front and rear openings of the housings and providing separate compartments for articles to be displayed, a mirror closing the rear opening of the rearmost housing, lamp means in each of the housings, and means for progressively illuminating the lamps from the front to the rear of the device whereby to cause the articles within the housings to be rendered visible in progressive sequence.

8. A display device comprising a supporting panel having an opening, a transparent mirror closing the opening in the panel, a mounting means for holding the mirror secured to the panel, supporting arms detachably attached to the said mounting means, a plurality of housings resting upon the supporting arms rearwardly of the panel, said housings having aligning front and rear openings disposed in register with the opening in the said panel, a transparent mirror interposed between each of the housings and carried by the said supporting arms, a mirror closing the rear opening of the rearmost housing, mounting means for detachably securing the last mentioned mirror to the supporting arms, lamp means disposed in each of the housings, and means for flashing the lamps in a predetermined sequence.

9. A display device comprising a plurality of housings having aligning front and rear openings, a transparent mirror interposed between each of the housings for closing the registering front and rear openings thereof, other transparent mirrors closing the front and rear openings of the foremost and rearmost housings, a retaining band secured to the last mentioned mirrors, coupling means detachably connecting with each of the retaining bands, lamp means mounted in each of the housings, and means for flashing the lamps in a predetermined sequence.

10. A display device comprising a housing having aligning front and rear openings, a mirror closing each of the said openings and at least one of the said mirrors being transparent, means supporting each of the said mirrors, and a coupling means extending between the supporting means and detachably connecting therewith.

ALTON B. YEARTA.